United States Patent [19]

Gozlan

[11] Patent Number: 4,540,162
[45] Date of Patent: Sep. 10, 1985

[54] GAS-SCRUBBING AND METAL-REFINING PROCESS AND SYSTEM

[76] Inventor: Armand Gozlan, 6600 Kildare Rd., Apt. 1903, Côte Saint-Luc, Canada, H4W 2V4

[21] Appl. No.: 469,155

[22] Filed: Feb. 24, 1983

[51] Int. Cl.³ .............................................. B01D 50/00
[52] U.S. Cl. ..................... 266/146; 266/152; 266/157; 202/182; 203/42; 55/222; 55/256; 55/258; 261/122; 422/170
[58] Field of Search .............. 266/144, 146, 157, 148, 266/151, 152; 203/33, 42; 202/182, 183, 184; 423/27, 42; 261/81, 122; 55/222, 223, 256, 257 R, 258; 422/170

[56] References Cited

U.S. PATENT DOCUMENTS

| | | | |
|---|---|---|---|
| 1,374,689 | 4/1921 | Torrey | 55/256 |
| 1,525,060 | 3/1925 | Bertsch | 55/257 R |
| 2,094,027 | 9/1937 | Stitzer | 55/222 |
| 2,612,745 | 10/1952 | Vecchio | 55/222 |
| 2,843,217 | 7/1958 | Von Linde | 55/223 |
| 3,504,481 | 4/1970 | Zakarian et al. | 266/146 |
| 3,853,986 | 12/1974 | Blass et al. | 261/122 |
| 4,215,082 | 7/1980 | Danel | 261/122 |
| 4,251,486 | 2/1981 | Sohda | 55/223 |
| 4,426,210 | 1/1984 | Drawert et al. | 55/222 |

*Primary Examiner*—L. Dewayne Rutledge
*Assistant Examiner*—Robert L. McDowell

[57] ABSTRACT

A metal-refining process and a corresponding system characterized by being adapted to minimize the health hazard by appropriate purification of the gases or vapor products resulting from acid action on a metal compound. This metal refining features the use of vacuum at a downstream point to regulate the admixing of air with the vapor products in the effluent and to draw activating air in the mixture of acid and metal compound at the upstream point. This refining system includes gas outlet manifolds constructed and arranged to enhance the purification of the vapor products by comminuting the vapor products into small bubbles upwardly through a water tank. Each manifold consists of a casing having a plurality of small gas outlet apertures each communicating with a small tube which extends within the casing and has a bevelled end for self-cleaning of the tube. These tubes prevent clogging of the apertures by solid particles in the gas flowing through the casing.

4 Claims, 10 Drawing Figures

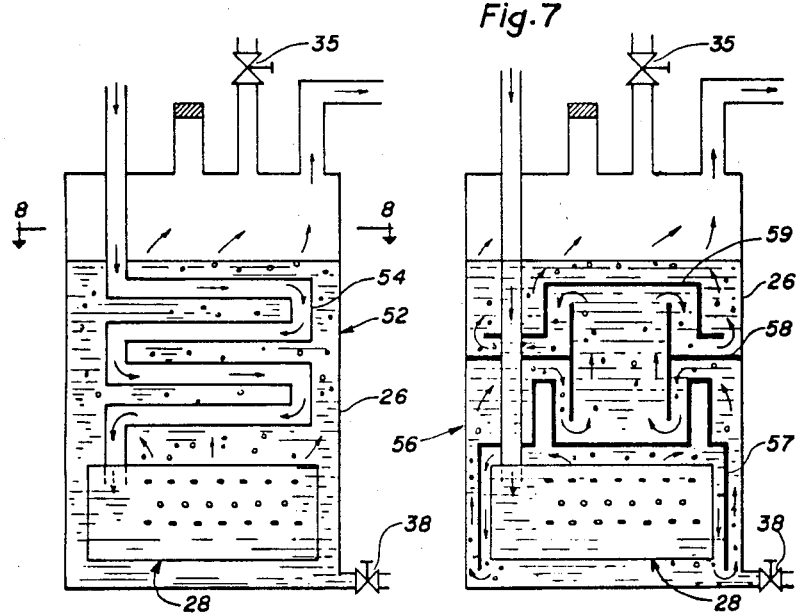
Fig. 7
Fig. 6
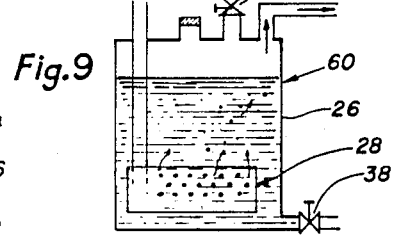
Fig. 9
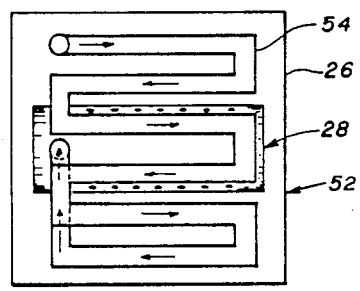
Fig. 8
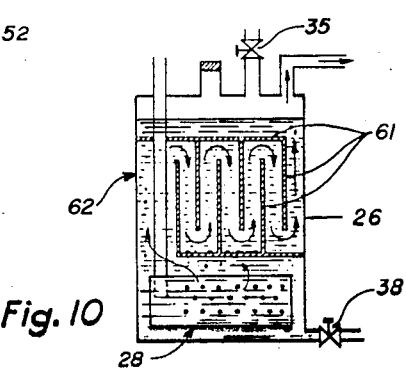
Fig. 10

GAS-SCRUBBING AND METAL-REFINING PROCESS AND SYSTEM

FIELD OF THE INVENTION

This invention relates to metal refining and, in particular, to a metal-refining process and system to refine precious metals, such as gold and silver, by a jeweller.

DESCRIPTION OF THE PRIOR ART

The refining of metals generates a substantial amount of vapors that are toxic or harmful to the health. The applicant has noted a need to properly process the exhaust gases or vapor products to minimize the health hazard encountered by those proceeding with such refining.

SUMMARY OF THE INVENTION

It is a general object of the present invention to provide a metal-refining process and system of the above type, which are particularly conceived to minimize the health hazard associated with the resulting vapor products.

It is a more specific object of the present invention to provide a metal-refining process and system in which the resulting vapor products are efficiently condensed and purified before their free exhaust, so as not to pollute the external air.

It is another object of the present invention to provide a metal-refining process and system that purify the resulting vapor products and also simultaneously retrieve the precious metal particles carried by the vapor products.

It is a further object of the present invention to provide a metal-refining process and system which effectively use vacuum to induce exhaust and circulation of the vapor products generated by the refining, to induce the entry of air into the reactants to activate acid action on the metal compound and to regulate the admixing of air with the vapor products in the mixed effluent.

It is still another object of the present invention to provide a metal-refining process and system wherein the resulting vapor products or gases are efficiently purified by comminuted air bubbles and gas outlet manifolds to produce them.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings, in which:

FIGS. 4 to 7 inclusive are vertical sectional views of gas purification tanks according to as many different embodiments usable in the system of FIG. 1;

FIG. 8 is a plan section taken along line 8—8 of FIG. 6; and

FIGS. 9 and 10 are vertical sectional views, on a smaller scale, of two additional embodiments of the purification tanks.

DESCRIPTION OF THE PREFERRED EMBODIMENT

Figure 1:
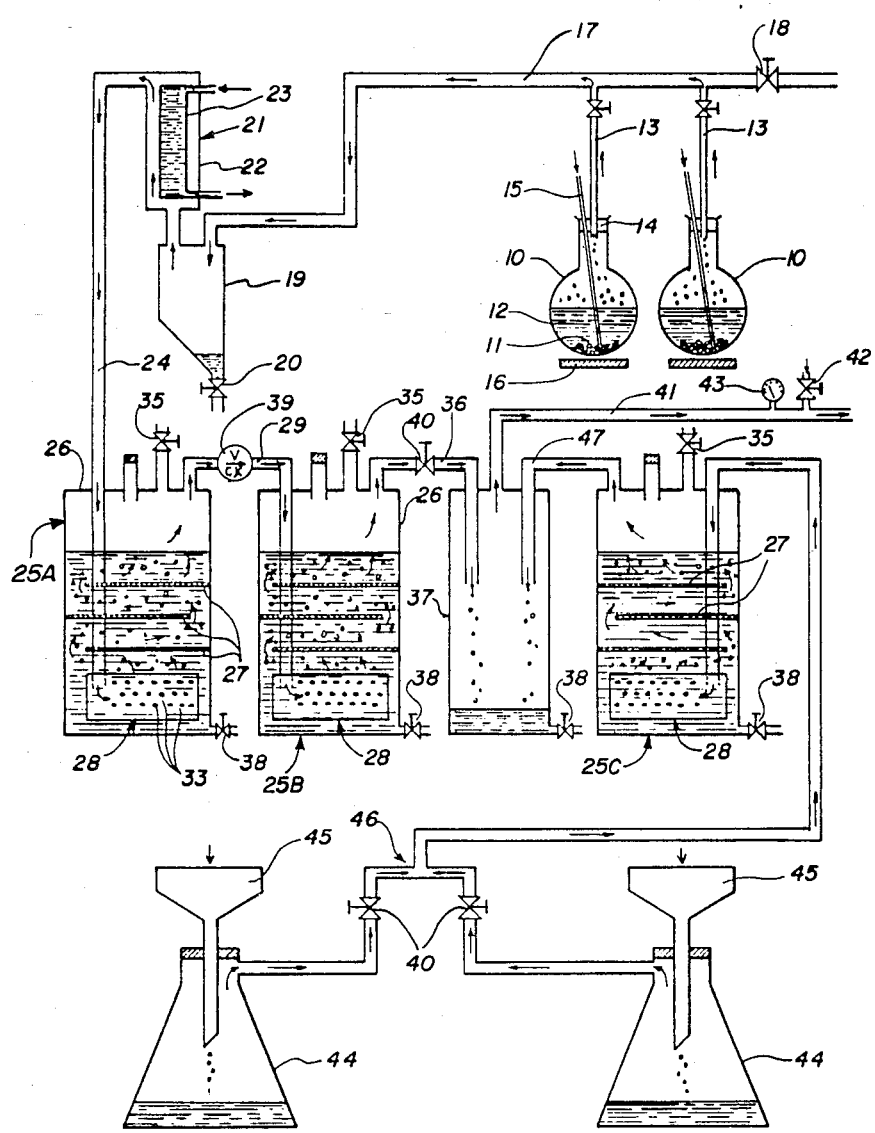
FIG. 1 is a schematic view of a metal-refining system operating according to the process of the present invention.

The metal-refining system illustrated in FIG. 1 includes a pair of containers 10 schematically representing flasks in which any desired metal compound 11 and acid 12 may form a mixture to refine a metal, such as gold. The acid action on the metal compound results in toxic vapor products flowing out of the tube 13 inserted through the cap 14 of the corresponding flask 10. A glass tube 15 also extends through each cap 14 for the intake of air into the metal compound and acid mixture and to thus activate the acid action. A heating plate 16 is preferably also used to heat the mixture and thus also accelerate the acid action and the output of vapor products.

The flasks 10 define the upstream point of a tubular vapor exhaust line including an upstream exhaust tube section 17. A valve 18 is provided at the end of the tube section 17 to selectively allow a flow of water through it to wash off any metal deposit from it into a sump 19. A drain valve 20 is provided at the bottom of the sump to drain the condensate from it. That condensate comes from an overlying condenser 21 that drains into the sump 19. The condenser 21 includes an outer shell 22 forming a passage for the vapor products through it around a condensing cold water coil 23. The condenser 21 thus converts some of the original vapor products into a condensate draining into the sump 19. That condensate carries some metal in it.

An intermediate exhaust tube section 24 continues the vapor products exhaust line serially with the tube section 17, the sump 19, the condenser 21 and a pair of upstream and downstream gas purification tanks by 25A, 25B, respectively at its downstream end.

Each gas purification tank 25A, 25B includes a container 26 which is about two-thirds full of liquid. A system of baffle plates 27 are fixed inside the container 26 and are immersed in the water. A gas outlet manifold 28 is immersed in each gas purification tank below the corresponding set of baffle plates 27. The intermediate exhaust tube section 24 extends downwardly into one gas outlet manifold 28. The two or more gas purification tanks are serially connected by a gas exhaust tube section 29 extending downwardly into the gas outlet manifold 28 from the top of the gas purification tank in which the tube section 24 is engaged.

Figures 2, 3:
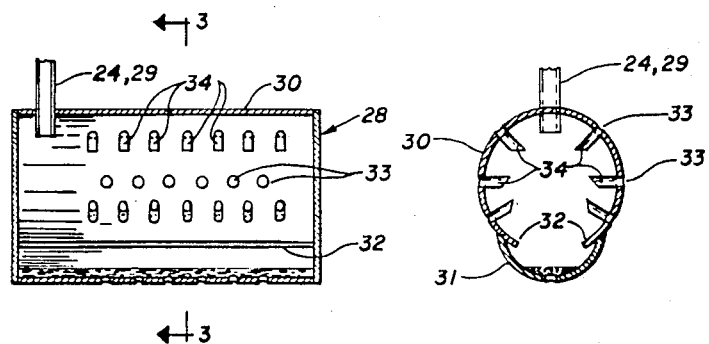
FIG. 2 is a cross-sectional view of a gas outlet manifold forming part of the system of FIG. 1.
FIG. 3 is a cross-sectional view as seen along line 3—3 in FIG. 2.

Each gas outlet manifold 28, as shown in FIGS. 2 and 3, includes a casing formed of an upper and larger cylindrical housing portion 30 and a lower and smaller cylindrical housing portion 31. The larger housing portion 30 is longitudinally cut off at its bottom to form a pair of edge portions or lips 32 overlying a portion of the smaller housing portion 31 to minimize upward flow and suction of solid particles upward toward the tiny gas outlet apertures 33 provided around and along the housing portion 30. A flexible entrance tube 34 communicates with each gas outlet aperture 33 inside each gas outlet manifold 28 for passage of vapor products through each gas outlet manifold, self-cleaning of solid deposits on the entrance tubes upon their vibration, and comminuting of the vapor products upon exit through the tiny apertures 33. Each tube 24 has a bevelled inlet end so that any deposits reaching said bevelled ends will fall back into the bottom of casing 28, even if tubes 34 are not vibrating. Clogging of apertures 33 is thus prevented. The small vapor bubbles are easily cleaned upon their upward path around the baffle plates 27.

Each of the gas purification tanks 25A, 25B is provided with a valve 35 for selective admission of air into the top of the tank. The tank 25B has its upper end connected by a vapor exhaust tube section 36 in communication with an almost empty tank 37. The latter is kept almost empty to prevent the suction of liquid from the tanks 25A, 25B into it. Any liquid escaping from the tanks 25A, 25B collects at the bottom of the tank 37, this bottom being lower than downstream end of the tube 36.

There may be used more than one tank 37 and also any number of tanks 25A and/or 25B, all serially arranged as shown. Each of the tanks 25A, 25B, 37 is provided with a draining valve 38 at its bottom to drain off any amount of liquid from it. The water in the first tank 25A is used to cool the vapors or gases and to retrieve the little precious metal that escapes the condenser 21 and sump 19. In the other tank 25B, there is caustic soda or slaked lime diluted in water to wash off any acid from the gases before releasing them outside. The tube sections 29 and 36 are provided with a check valve 39 and a manually-operated valve 40, respectively.

The tubular vapor exhaust line terminates with a downstream tube section 41 that runs out from the top of the tank 37 and that is connected to a source of vacuum for drawing the effluent off the system. An adjustable air intake valve 42 is parallel connected to the downstream end of the tube section 41 to adjustably admit air and thus control the amount of vacuum in the system and therefore the rate at which gas bubbles are formed and travel in the liquid of tanks 25 to obtain maximum efficiency in gas washing. A pressure gauge 43 is connected to the tube section 41 to indicate the vacuum in the system.

Check valve 39 prevents the liquid in downstream tank 25B from flowing back into upstream tank 25A when vacuum ceases in tube section 41 at the end of the refining operation.

The metal-refining system may also include, as shown in FIG. 1, a filtration portion. The latter includes a pair of flasks 44 into which is filtrated a metal compound by filters 45. The outlet tube of each flask 44 has a manually-operated valve 40. The vapors from those flasks are passed by a tube and valve assembly 46 to a third gas purification tank 25C. The latter is connected to the tank 37 by another tube section 47.

The tanks 25A, 25B, 25C are provided with baffle plates 27 to increase the path of travel of the gas bubbles and to thus enhance their purification. Other types of baffles may be mounted in the container 26 of the gas purification tank.

Figures 4, 5:
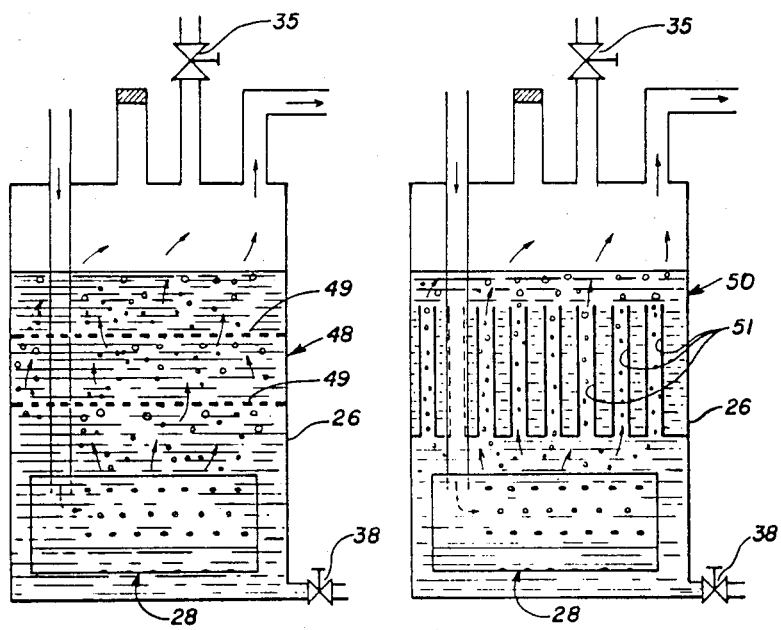

As shown in FIG. 4, the gas purification tank 48 may have baffles 49 in the form of screens or apertured plates to force comminuting of the gas into small bubbles. The gas purification tank 50 of FIG. 5 is provided with an array of chimneys or vertical passages 51 through which the air bubbles must find their way to the top of the tank without mixing with the air bubbles rising through the other chimneys 51.

The gas purification tank 56 of FIG. 7 has an intricate baffle system, made of essentially three baffle elements 57, 58, and 59 to provide a variety of changes of directions of flow of the gas bubbles within that tank, as well shown by the arrows from the manifold 28 to the top of the tank 56. The gas purification tank 62 of FIG. 10 shows still another arrangement of baffles 61.

The gas purification tanks 52 of FIGS. 6 and 8 and tank 60 of FIG. 9, respectively, are used without any baffle. These tanks are used when gas purification is easier to make.

Tank 52 of FIGS. 6 and 8 is very efficient as a gas-cooling device, since the tube section coming from condenser 21 and leading to gas outlet manifold 28 has a portion 54 immersed in the cooling liquid tank 52, which forms a serpentine, both in the vertical and horizontal planes, to increase the heat-exchanging surface of said portion 54. One or more tanks 52 can be serially connected between condenser 21 and the first purification tank 25A of FIG. 1.

Referring to FIG. 1, it will be noted that tube section 17 can be made long enough to install condenser 21 and sump 19 at a location which is completely out of the way of the station wheren the operator has a better access to flasks 10. Several such flasks 10 can be connected to sump 19, whereby some flasks may continue to operate while the others are being replenished.

It will also be noted that the filtration portion 44 to 46 may be operated concurrently with the metal-refining portion 10 to 36, or both operations may be carried out independently of each other.

What I claim is:

1. In a metal-refining system, the combination comprising: a container for reacting a metal compound with an acid in a liquid and solid mixture contained in said container with production of solid particles and toxic vapor products, a first air intake tube opening within said liquid and solid mixture and an exhaust line serially including said first air intake tube and said container with said first air intake tube defining the upstream end of said line, the downstream end of said line being connected to a source of vacuum, a gas flow-adjustable second air intake connected to said line adjacent said downstream end to adjust the vacuum in said line, said line serially including, downstream from said container, a sump and a heat exchanger disposed above said sump, said sump collecting solid particles entrained by the vapors flowing through said line from said container to said sump, said sump also collecting liquid condensate formed in said heat exchanger, said line further serially including downstream from said heat exchanger a vapor purifying means including an upstream and a downstream tank each containing a liquid and each having a vapor outlet at the top of the tank, the liquid in said upstream tank being water, the liquid in said downstream tank being a water solution of a substance selected from the group consisting of caustic soda and slaked lime, a casing in each tank immersed in said liquid, the casing in said upstream tank having a vapor inlet serially communicating through said line with the downstream end of said heat exchanger, the casing in said downstream tank having a vapor inlet connected to the vapor outlet of said upstream tank, each casing having a wall formed with a plurality of tiny gas outlet apertures for producing gas bubbles rising in said liquid, each casing enclosing entrance tubes, each having an outlet end fixed to the inside of said wall and communicating with one of said gas outlet apertures, each entrance tube having an inlet end opening within said casing, whereby any solid particles in said casing reaching said inlet end of said tube will fall back towards the bottom of said casing, thereby preventing clogging of said gas outlet apertures.

2. In a metal-refining system as defined in claim 1, wherein each casing has an upper section and a lower section, said apertures and tubes made in and extending within said upper section, respectively, each casing further having lips extending within said casing at the junction of said upper and lower section to aid in preventing solid particles in said lower section from rising into said upper section and reach the inlet ends of said entrance tubes.

3. In a metal-refining system as defined in claim 2, further including baffle devices immersed in said liquid and disposed above said casing to cause a change of direction in the travel of gas buffles rising from said casing through said liquid.

4. In a metal-refining system as defined in claim 3, further including a filtration section including at least one filtration flask communicating with the downstream end of said line for filtration under vacuum of solid particles recovered from said sump from said tanks.

* * * * *